(12) United States Patent
Hu et al.

(10) Patent No.: US 7,538,067 B2
(45) Date of Patent: May 26, 2009

(54) COMPOSITION OF, AND PROCESS FOR PREPARING, SILICA XEROGEL FOR BEER STABILIZATION

(75) Inventors: Yatao Hu, Malvern, PA (US); Larissa Ding, Audubon, PA (US); Robert E. Patterson, Radnor, PA (US)

(73) Assignee: PQ Corporation, Berwyn, PA (US)

( * ) Notice: Subject to any disclaimer, the term of this patent is extended or adjusted under 35 U.S.C. 154(b) by 211 days.

(21) Appl. No.: 11/803,266

(22) Filed: May 14, 2007

(65) Prior Publication Data
US 2007/0219091 A1 Sep. 20, 2007

Related U.S. Application Data

(62) Division of application No. 10/748,892, filed on Dec. 30, 2003, now Pat. No. 7,229,655.

(51) Int. Cl.
*B01J 20/10* (2006.01)
*B01J 20/04* (2006.01)

(52) U.S. Cl. .................. 502/405; 502/407; 502/411; 423/331; 423/332

(58) Field of Classification Search .............. 210/502.1; 502/405
See application file for complete search history.

(56) References Cited

U.S. PATENT DOCUMENTS

| 4,515,821 | A | 5/1985 | Armstead et al. |
| 4,975,405 | A | 12/1990 | Okamura et al. |
| 5,149,553 | A | 9/1992 | Berg et al. |
| 5,215,733 | A | 6/1993 | Potter |
| 5,252,762 | A | 10/1993 | Denton |
| 5,622,743 | A * | 4/1997 | Tanaka et al. ............ 426/330.4 |
| 6,248,911 | B1 | 6/2001 | Canessa et al. |
| 6,355,596 | B2 | 3/2002 | Hu et al. |
| 6,555,151 | B2 | 4/2003 | Hu et al. |
| 2001/0023233 | A1 | 9/2001 | Shiuh et al. |
| 2004/0043119 | A1 | 3/2004 | Rehmanji et al. |

FOREIGN PATENT DOCUMENTS

| EP | 0 064 620 A1 | 11/1982 |
| EP | 0 105 633 A2 | 4/1984 |
| EP | 0 235 352 A2 | 9/1987 |
| EP | 0 447 542 B1 | 11/1996 |
| GB | 981715 | 1/1965 |
| GB | 1 215 928 | 12/1970 |
| GB | 1 279 250 | 6/1972 |
| WO | WO-00/66705 | 11/2000 |

OTHER PUBLICATIONS

U. Kalapathy, A. Proctor, and J. Shultz, "An improved method for production of silica from rice hull ash," *Bioresource Technology*, vol. 85, 2000, pp. 285-289.

* cited by examiner

*Primary Examiner*—Melvin C Mayes
*Assistant Examiner*—James Corno

(57) ABSTRACT

A silica xerogel, a process for making it, and a process for using it to reduce chill haze in beer includes incorporation in the xerogel of one or more alkali metals, optionally in combination with one or more alkaline earth metals. The pH of the xerogel is between 8.0 and 10.5, preferably between 8.5 and 10.0.

26 Claims, No Drawings

COMPOSITION OF, AND PROCESS FOR PREPARING, SILICA XEROGEL FOR BEER STABILIZATION

This application is a Divisional of U.S. application Ser. No. 10/748,892 filed Dec. 30, 2003, now U.S. Pat. No. 7,229,655.

FIELD OF THE INVENTION

The present invention pertains to removing certain proteins that lead to chillhaze in beverages, such as beer.

BACKGROUND OF THE INVENTION

Silica gels have been used to remove certain undesirable components from certain beverages, typically by adsorption. For example, silica xerogels have been used in brewing processes to reduce chill haze in beer by adsorbing certain proteins that are generally responsible for haze formation. Indeed, silica xerogels constitute one of the most widely used classes of chill haze reducer for beer. For example, U.S. Pat. No. 5,149,553 to Berg et al. teaches that silica gel on which multivalent cations are adsorbed, especially Mg and Ca, has enhanced performance as a beer haze reducer. However, it is generally accepted by those skilled in the art that alkali metals are undesirable when present in silica gel used as a haze reducer. It is in fact common for xerogels used for this purpose to carry a specification requiring that they be washed substantially free of sodium or other alkali metal salts.

SUMMARY OF THE INVENTION

In one aspect, the invention is a composition comprising a silica xerogel comprising between 0.2 and 1.0 mmol/g of a metal component, wherein the metal component comprises at least one alkali metal in an amount between 0.2 mmol/g and 1.0 mmol/g, the xerogel having a pH between 8.0 and 10.5.

In another aspect, the invention is a method for treating beer comprising contacting the beer with a composition comprising a silica xerogel comprising between 0.2 and 1.0 mmol/g of a metal component, wherein the metal component comprises at least one alkali metal in an amount between 0.2 mmol/g and 1.0 mmol/g, the xerogel having a pH between 8.0 and 10.5.

In yet another aspect, the invention is a method of making a silica xerogel comprising the steps of:
a) contacting an aqueous alkali metal silicate with an amount of an aqueous mineral acid sufficient to neutralize between 70% and 95% of the alkali metal in the alkali metal silicate, thereby forming a hydrogel;
b) contacting the hydrogel with an aqueous solution of an alkaline earth metal salt to incorporate at least a portion of the alkaline earth metal into the hydrogel;
c) aging the hydrogel;
d) washing the hydrogel with water; and
e) drying the hydrogel to form a xerogel;
wherein the silica xerogel comprises between 0.2 and 1.0 mmol/g of a metal component comprising at least 0.2 mmol/g but less than 1.0 mmol/g of the alkali metal and correspondingly no more than 0.8 mmol/g but more than 0 mmol/g of the alkaline earth metal, the xerogel having a pH between 8.0 and 10.5.

DETAILED DESCRIPTION OF THE INVENTION

In accordance with the present invention, the presence of alkali metals in certain amounts has been found to increase the haze reduction performance of silica xerogels, despite the common belief that such alkali metal content should be minimized in food-grade silica gels intended for beer treatment. As used herein, the term "xerogels" refers to silica gels having a loss on drying (LOD, corresponding approximately to water content) of 25% or less.

In xerogels according to the invention, the amount of alkali metal present in the xerogel constitutes at least 0.2 mmol/g of the xerogel, and the total of alkali metals and alkaline earth metals constitutes at least 0.2 mmol/g of the xerogel, preferably at least 0.3 mmol/g, and more preferably at least 0.4 mmol/g. It constitutes at most 1.0 mmol/g of the xerogel, preferably at most 0.8 mmol/g, and more preferably at most 0.7 mmol/g. Optionally, alkaline earth metals may also be present in the xerogel, in addition to the alkali metal or metals. In one embodiment of the invention, the xerogel comprises less than 0.1 mmol/g combined of alkaline earth metals.

The pH of xerogels according to the invention is at least 8.0 and preferably at least 8.5, measured as a 10% aqueous slurry. In one embodiment, the pH is at most 10.5, preferably at most 10.0. The upper limit of acceptable pH is the point at which excessive dissolution of the silica in aqueous environments becomes a problem.

Silica xerogels according to the invention may be prepared by using either acid-set or alkaline-set processes, such as are generally known in the art, modified as outlined below to include certain specific amounts of alkali metal in the final product.

Alkaline-Set Silica Xerogels

Alkaline-set silica xerogels according to the invention can be made by first forming silica hydrosols by simultaneously and instantaneously mixing aqueous solutions of an acid and of sodium or potassium silicate. For example, an aqueous mineral acid such as sulfuric acid, nitric acid, or hydrochloric acid may be combined with the sodium or potassium silicate solution. The concentrations and flow rates or proportions are typically adjusted so that the hydrosol contains about 5 to 14% $SiO_2$ and so that only sixty to ninety-nine percent of the alkali metal present in the silicate solution is neutralized and, most preferably, 70% to 95% of the alkali metal is neutralized. Thus, a portion of the alkali metal remains with the silica hydrosol as counterions to basic silicate species, with the amount of such alkali metal being represented as unreacted $M_2O$, where M is the alkali metal. The silicate/acid mixture is then forced through a conventional nozzle as is commonly practiced in the industry. As used herein, it is to be understood that reference to an alkali metal being "neutralized" refers to protonation of corresponding basic anions in the alkali metal silicate. From the nozzle, the mixture forms hydrosol droplets, which gel quickly in a mass to form hydrogel beads, all in a manner known in the art. In one embodiment, the hydrosol contains about 10% $SiO_2$, has a pH above about 8, and gels in a matter of 20 to 1,000 milliseconds.

The hydrogel may be collected in a form and in a manner according to any of various means commonly practiced in the art. In one particular embodiment, the hydrosol is sprayed into the air to form hydrogel beads, as is described in U.S. Pat. No. 6,355,596, incorporated herein by reference. These beads are then preferably collected in water or in an aqueous solution containing one or more inorganic salts, for example sodium sulfate, magnesium sulfate, ammonium sulfate, calcium chloride, potassium sulfate, sodium chloride, ammonium chloride, magnesium chloride, and potassium chloride. It is to be noted that, although this embodiment produces the gel in the form of spheres, any shape may be used.

The hydrogel, for example in the form of beads, may then optionally be aged under controlled conditions such as can be readily determined by one of ordinary skill in the art, to give surface area and other properties suitable for the particular application contemplated. Typical conditions include a pH between about 7 and 10.5, a temperature between about 50° C. and 100° C., and an aging time between about 1 and about 40 hours. This aging, or "steeping," serves to decrease the surface area of the xerogel particles while increasing the pore diameter. This may be useful in situations where, due to the particular conditions under which the hydrogel has been made, an increase in pore diameter is needed to provide effective adsorption of chill haze proteins. In general, as reaction time, temperature and pH are increased, the surface area of the gel particles decreases.

After the aging period, the gel is acidified to a pH of about 2 and washed with acidified water having a pH between about 2 and about 4 to remove most or all of the water-soluble salts from the silica hydrogel. Typically the pH of the wash water is between 2.5 and 4.0, more typically between 3.0 and 3.5. The washing may be performed as a batch, cocurrent flow, or countercurrent flow process. Multiple washings may occur, after which the washed silica hydrogel is isolated, typically by filtration or draining.

The hydrogel may then be treated with an aqueous solution containing a basic alkali metal salt, at a pH chosen to provide a product having a pH between 8.0 and 10.5. Higher pH generally leads to a higher percentage of Na being adsorbed onto the xerogel surface. In one exemplary embodiment of the invention, the alkali metal salt comprises sodium, which may be in the form of a basic water soluble salt, with nonlimiting examples of counterions being carbonate, bicarbonate, acetate, hydroxide, or a combination of any of these. In another embodiment, the alkali metal salt comprises potassium, which may be provided as a salt with counterions such as those recited above for sodium. Mixtures of alkali metals may also be used according to the invention.

After the foregoing treatment, the gel is isolated, dried to form a xerogel and milled (typically dried and milled simultaneously) to produce particles of suitable size for treating beer, typically with an average particle size between about 10 μm and 20 μm. The method just described has the advantage that precise levels of alkali metal can be introduced into the xerogel. In cases where an alkali metal hydroxide is used, close to 100% of the metal in the aqueous solution is incorporated in the xerogel, simplifying a determination of the right amount of basic salt to use. If salts of lower basicity such as carbonates or acetates are used, deviation from 100% incorporation increases.

An alternative process for introducing desired amounts of alkali metals into alkaline-set silicas may be used in cases where a more rapid and potentially less expensive process of incorporating the metals is desired. In this method, the procedure described above is modified such that the xerogel, for example in the form of spheres, is collected in water containing essentially no salts. After the aging period, the silica spheres are washed with water to remove most or all of the water-soluble salts from the hydrogel. Then the material is isolated, dried and milled to form a dried xerogel powder. Typically, such a powder may have an average particle diameter of about 10-20 μm. An advantage of this preparation method is that a product having alkali metal content and pH within acceptable ranges can be obtained directly, thus avoiding the step of removing nearly all of the alkali metal (measured as $M_2O$), only to add it back again in a separate step. When this method is used, the alkali metal content will be mainly determined by the degree of neutralization used during gel formation and by the extent of washing, with degree of neutralization being the dominant factor.

If alkaline earth metals are desired to be incorporated into the xerogel, such incorporation may be accomplished by contacting the hydrogel with an aqueous solution of an alkaline earth salt, for example $MgSO_4$, before the treatment with the basic alkali metal salt. Any alkaline earth metal may be used, and calcium and magnesium are preferred. Thus, for example, suitable incorporation of magnesium may be achieved by forming alkaline-set gel beads as described above, catching the beads in aqueous $MgSO_4$ solution containing the desired amount of magnesium to be incorporated into the silica, thereby replacing a fraction of the un-neutralized alkali metal, and then aging the gel and washing the gel with neutral water. If the reaction proceeds to completion, the exchange is stoichiometric—for example, one mole Mg for two moles Na. In general, the amount of magnesium incorporated into the xerogels by this method is very close to the total amount of magnesium put into the aqueous $MgSO_4$ solution; that is, most of the Mg in the $MgSO_4$ present in solution is captured by the silica and incorporated into it (so long as Mg is not present in stoichiometric excess).

If an alkaline earth metal is incorporated in the silica gel, for example by using the method described above, the molar ratio of the alkali metal to alkaline earth metal may be varied over a wide range, depending upon the needs of the specific application. Typically the ratio is between about 5:95 and about 95:5. More commonly, the ratio is between about 30:70 and about 70:30. Thus one exemplary xerogel according to the invention comprises between 0.2 and 1.0 mmol/g of a metal component comprising at least 0.2 mmol/g but less than 1.0 mmol/g of the alkali metal, and correspondingly comprising no more than 0.8 mmol/g but more than 0 mmol/g of the alkaline earth metal, with the xerogel having a pH between 8.0 and 10.5.

Acid-Set Silica Xerogels

An acid-set process can also be used for preparing xerogels according to the invention. In such a process, silica hydrosols are formed by mixing aqueous solutions of a mineral acid, such as sulfuric acid, and sodium or potassium silicate. The concentrations and flow rates or proportions are adjusted so that the hydrosol contains between 5 and 20% $SiO_2$ by weight. More than enough acid is added to neutralize all of the alkali metal present in the silicate solution and, preferably, enough to provide a 5 to 40 percent molar excess beyond that stoichiometrically required to fully neutralize the sodium or potassium. Thus, there is substantially no unreacted $M_2O$ in the resulting silica hydrosol.

The hydrosol is then forced through a nozzle, whereupon it falls onto a moving belt or into a tank and is allowed to set to form a hydrogel mass, all in a known manner. The hydrogel is allowed to age on the belt or in the tank for a sufficient period of time for the hydrogel to become firm for further processing. In one embodiment, the hydrosol contains about 18% $SiO_2$ and has a pH below about 1. Silica hydrosols of this type typically gel in a matter of a few minutes to form the hydrogel mass.

The hydrogel is then crushed and washed with acidified water to remove salts. Multiple washings may occur as is well-known in the art, until the salt concentration in the gel is at or below an acceptable level, preferably at or close to zero. If desired, the pH of the gel can be adjusted to near or above neutral, and the gel may be hydrothermally treated to decrease the surface area and increase the pore diameter of the derived xerogel, all in a known manner. Optionally the gel can be acidified and washed again. This may for example be done in a situation where a hydrothermal treatment is applied, with the typical attendant use of ammonia being made to adjust the pH to above neutral prior to the treatment. In this case, the optional acidifying and washing step removes the ammonia, and also further reduces the salt concentration in the gel. The silica gel may then be treated with aqueous basic alkali metal salts as described above in the alternative process for introducing desired amounts of alkali metals into alkaline-set silicas, and dried and milled as described above.

Optionally, xerogels made by any of the foregoing processes may be calcined to increase the haze reduction performance of the xerogel, according to the invention. Such calcination is typically performed at a temperature between about 400° C. and 850° C., by means known to the person of normal skill in the art. As is well known in the art, increasing levels of sodium tend to result in decreasing surface area in the final product, due to the fluxing/sintering effect of sodium. The person of ordinary skill in the art will take this effect into account as needed, depending upon the physical and performance properties sought for the particular xerogel being prepared.

Xerogels having a wide range of porosimetry and morphological properties may be produced according to the invention. In general, while it is believed that no particular range of pore volume, surface area, or particle size is critical for xerogels of the present invention, certain guidelines can be given. For use of the xerogels in chill haze reduction of beer, the xerogel must have a pore diameter above about 60 Å in order to effectively admit (and thereby remove) beer haze proteins. It may also be desirable to set some upper limit on the pore diameter of xerogels used for beer clarification, but the applicants are aware of no clearly definable value for such a limit. In general, and as is known to those of skill in the art, increases in pore diameter tend to be attended by decreases in surface area, which at some point begins to hurt haze reduction performance. Furthermore, some skilled in the art have claimed that excessive average pore diameter may lead to undesired adsorption of beer foam proteins, but a consensus of scientific opinion appears to be lacking. Also, it is well known that particle size affects both rate of protein uptake and tightness of filtration, both of which impact chillproofing performance. Thus, one exemplary xerogel having a surface area of between 250 and 450 $m^2/g$ and an average pore diameter of above about 60 Å has been found to be suitable for reducing beer chill haze. Adjustment of proportions, concentrations, times, temperatures, milling conditions and other parameters to arrive at this or another particular set of desired porosimetry and morphological properties is well within the ability of a person of normal skill in the art.

Without wishing to be bound by any particular theory or explanation, it is believed that xerogels of the present invention comprise alkali metals that are bound to the xerogel surface through ion-exchange reaction with silanol groups; i.e. they are present largely as Si—O—Na, rather than as unbound salts (such as sodium carbonate or sulfate). In this sense, the level of alkali metals present in the gel is thought to be at least a qualitative indication of the presence of basic sites in the xerogel. It is further believed that the presence of alkali metals associated with bound alkaline sites may be at least partially responsible for the enhanced haze reducing ability of xerogels according to the invention.

Xerogels according to the invention have a pH between 8.0 and 10.5. By using a xerogel pH within this range, the presence of alkali metal (for example Na) in the form of Si—O—Na is thought to be favored over the presence of salts such as $Na_2CO_3$ or $Na_2SO_4$ occluded in the pores of the xerogel, and it is speculated that the Si—O—Na form is more active in reducing chill haze than are such salts.

Beverage Treatment

Xerogel adsorbents according to the invention are used in a process for removing haze-active components from a beverage, thereby reducing chill haze. This process is accomplished by simply contacting the adsorbent of the present invention with the beverage in any conventional manner that facilitates adsorption of the haze-forming materials. The adsorption step may be any convenient batch or continuous process. In any case, agitation or other mixing typically enhances the efficiency of the adsorbent.

Adsorption may be conducted at any convenient temperature at which the beverage is a liquid. Typically, the beverage temperature is between about 29° F. and 40° F. The beverage and adsorbent are contacted as described above for a period of time sufficient to achieve the desired component percentage reduction in the treated beverage. The specific contact time may depend somewhat on the selected process, i.e., batch or continuous; with the type and condition of the beverage to be treated; with the concentration of the components in the beverage; and with the particular adsorbent being used. In cases where the contact time is already set, the particle size of the adsorbent may be varied by ways known in the art to meet the various process conditions. In addition, the relative quantity of adsorbent brought into contact with the beverage will also affect the amount of haze-forming components removed. The relative quantity of adsorbent added to the beer is expressed in parts per million (e.g., grams of adsorbent per 1,000,000 grams of beer). The adsorbent loading is typically between about 100 ppm and about 800 ppm, more typically between about 200 ppm and about 600 ppm, even more typically between about 300 ppm and 500 ppm.

During the refinement of beer, other additives are sometimes used to adsorb components and to perform other functions. The adsorbent silica xerogel of the present invention can be used effectively in the presence of other additives known in the industry. For example, polyvinylpolypyrrolidone, foam stabilizers, anti-oxidants, perlite, and diatomaceous earth are often added to beer prior to filtering, and may be used simultaneously with the silica xerogels of the present invention.

Regardless of which particular xerogel of the present invention is used, it may be separated from the treated beverage in any known manner following adsorption. For example, a filtration device may be used to separate the adsorbent from the treated beverage. Such filtration may comprise one or more filtering stages, and any method known in the art is suitable for removing silica xerogels according to the invention. Another suitable means of separation is centrifugation.

EXAMPLES

Xerogels according to the invention were evaluated for their chill haze reduction performance as follows.

Untreated beer was refrigerated at 0° C. during storage and handling, and protected against oxygen by $CO_2$. The headspace $O_2$ level was concluded to be less than 100 ppb during all handling, based on previous experience with the equipment and process used in this example. Measurement of contact time with the chillproofing agent started when an aliquot of beer was transferred into a tank containing a stirred deoxygenated slurry of chillproofer and diatomaceous earth filtration aid. The slurry contained about 10% (w/v) chillproofing agent, used in an amount necessary to provide the desired dose of agent. After the required contact time, the beer/agent slurry was pumped through a filter. After filtering, the beer was bottled anaerobically against a $CO_2$ back pressure. The bottled beer was incubated at 60° C. for five days and then stored at 0° C. for two days. This procedure, known as "heat forcing," is commonly used in the industry to accelerate haze formation, and simulates several months of room temperature storage. Total haze was measured with an Lg Automatic Haze Meter filled with ice water, and reported in ASBC FTU units.

Example 1

A xerogel according to the invention was prepared as follows. A silica hydrosol was formed by simultaneously and instantaneously mixing aqueous solutions of sulfuric acid and sodium silicate, using a mixing block in which silicate and acid streams were mixed tangentially. (The design of the mixing block is one typically used by practitioners of the silica gel art.) The concentrations and flow rates were adjusted so that the hydrosol contained about 12% $SiO_2$ and 90% of the alkali metal present in the silicate solution was neutralized. The silicate/acid mixture was then forced through a nozzle. From the nozzle, the mixture formed hydrosol droplets that transformed into hydrogel beads in less than one second. The beads were delivered into an aging tank containing water, and then aged at 64° C. for 16 hours. Following this, the beads were washed with plain water until the gel was substantially free of sodium sulfate. These beads were then milled and spray dried to produce a xerogel powder having a particle size of about 15 µm. This gel sample had the following characteristics: 419 $m^2/g$ surface area, 1.34 cc/g pore volume, 11,000 ppm (0.48 mmol/g) of Na, and a pH of about 10.

Comparative Example 2

A control xerogel was prepared in the same manner as for Example 1, except as follows. The hydrogel beads were delivered into an aging tank containing an approximately 3% aqueous solution of ammonium sulfate, rather than water. The beads were aged at 60° C. for 16 hours, then acidified to a pH of approximately 2, washed with acidified water rather than with plain water, and milled and spray dried, thus resulting in essentially complete removal of sodium from the gel and providing a product having a pH of about 3. The gel had a surface area of 391 $m^2/g$, a pore volume of 1.91 cc/g, and a sodium content of 120 ppm (0.005 mmol/g). Beer was treated at a dose of 480 ppm of silica gel. Following the heat forcing procedure described above, the total haze reading for beer treated with the control sample was 305 ASBC FTU, compared with 240 ASBC FTU for beer treated with the xerogel of Example 1 gel, made according to the invention. The untreated forced total haze was 1306 ASBC FTU.

Example 3

The results of a series of experiments involving xerogels having a variety of Na levels are shown in Table 1, where SA, PV, and LOD denote surface area, pore volume, and loss on drying (a measure of water content) of the xerogels, respectively. Permeability is that of a bed of the specified silica xerogel, with a higher value indicating faster flow of liquid through the bed. All of the xerogels in the table had a pH of about 10, and were prepared by first washing the gel essentially free of Na, and then adding NaOH back to the gel in an aqueous slurry, followed by drying the gel. Beer was treated at a dose of 480 ppm of silica gel. The results of chill haze testing for each of the xerogels thus produced are detailed in Table 1.

TABLE 1

| Sample ID | SA ($m^2/g$) | PV (cc/g) | LOD (%) | Permeability (D'Arcy) | Na (mmol/g) | Total Haze (ASBC FTU) | Corrected * Total Haze |
|---|---|---|---|---|---|---|---|
| 2209-9-01 | 334 | 1.85 | 4.0 | 0.112 | 0.0024 | 303 | 323 |
| 2209-9-02 | 306 | 1.64 | 4.4 | 0.172 | 0.0609 | 318 | 306 |
| 2209-9-03 | 323 | 1.73 | 4.3 | 0.147 | 0.102 | 293 | 295 |
| 2209-9-04 | 333 | 1.74 | 4.4 | 0.135 | 0.209 | 282 | 290 |
| 2209-9-05 | 326 | 1.78 | 4.1 | 0.167 | 0.363 | 269 | 260 |
| untreated | — | — | — | — | — | 1217 | — |

* Corrected Total Haze means Total Haze corrected for Permeability differences by normalizing to a permeability value of 0.15 D'Arcy.

As can be seen from the results shown in Table 1, the presence of increasing amounts of sodium (within the range tested) correlated with a decrease in total haze. Since permeability of the silica used is known to potentially have an effect on chill haze reduction, with lower permeability generally giving lower (better) chill haze results, the raw chill haze data were also normalized to a given permeability level, to see if that analysis resulted in a different conclusion regarding the effectiveness of various levels of sodium in the xerogel. As can be seen from Table 1, the correlation of chill haze with sodium content was somewhat improved by normalization, but the effect was not sufficient to change the basic response pattern. Further results, shown in the following examples, therefore use only raw chill haze data.

Example 4

Since the results shown in Table 1 showed the best chill haze reduction at the highest levels of Na content, testing of silica xerogels with higher levels of Na was performed. Sample 2287-37-3, the control gel, was made according to Example 2. All of the other silica xerogels were prepared by a direct synthesis method in which alkaline-set gels were prepared by making gel from 12% $SiO_2$ at a 90% neutralization level, and then washing separate portions of the gel to different extents. Although all portions were washed enough to remove almost all of the unbound salt, they were further washed to different extents so as to provide a range of bound Na concentrations. All of the gel samples had pH around 10. Beer was treated at a dose of about 480 ppm of silica gel. The results of chill haze testing using these samples are presented in Table 2.

TABLE 2

| Sample ID | SA ($m^2/g$) | PV (cc/g) | LOD (%) | Na (mmol/g) | Total Haze (ASBC FTU) |
|---|---|---|---|---|---|
| 2287-37-3 | 331 | 1.62 | 4.0 | 0.020 | 562 |
| 2287-37-9 | 314 | 1.41 | 7.8 | 0.609 | 485 |

TABLE 2-continued

| Sample ID | SA (m²/g) | PV (cc/g) | LOD (%) | Na (mmol/g) | Total Haze (ASBC FTU) |
|---|---|---|---|---|---|
| 2287-37-7 | 359 | 1.30 | 8.8 | 0.700 | 592 |
| 2287-37-5 | 393 | 1.12 | 8.5 | 0.761 | 677 |
| 2287-37-8 | 308 | 1.36 | 5.2 | 0.774 | 624 |
| 2287-37-6 | 328 | 1.22 | 8.5 | 0.826 | 702 |
| untreated | — | — | — | — | 1588 |

The best results reported in Table 2 were obtained at a Na content of about 0.6 mmol/g, with higher levels providing poorer (higher total haze) results. Thus the results of Tables 1 and 2 indicate that, for the particular silica xerogels tested, an optimum level of Na was somewhere within the range spanned by these two series of experiments.

Example 5

To determine whether the presence of magnesium had an effect on the efficacy of sodium as a chill haze reduction enhancer, silica xerogels were prepared by forming a silica hydrosol with 12% $SiO_2$ and 85% neutralization, catching beads in separate $MgSO_4$ solutions each having an amount of Mg calculated to replace only a fraction of un-neutralized Na, followed by aging and washing with neutral water. The final pH of each gel was about 9. The resulting series of gels incorporated various levels of Na and Mg, and were evaluated as described above for chill haze reduction performance. Sample 2209-51-1, the control gel, was made according to Example 2. Beer was treated at a dose of 480 ppm of silica gel. The results of this testing are shown in Table 3.

TABLE 3

| Sample ID | SA (m²/g) | PV (cc/g) | LOD (%) | Na (mmol/g) | Mg (mmol/g) | Na + Mg (mmol/g) | Total Haze (ASBC FTU) |
|---|---|---|---|---|---|---|---|
| 2209-51-1 | 391 | 1.91 | 4.3 | 0.005 | 0.002 | 0.007 | 305 |
| 2209-23-2 | 419 | 1.34 | 5.8 | 0.474 | 0.016 | 0.490 | 240 |
| 2209-23-3 | 395 | 1.30 | 6.2 | 0.470 | 0.399 | 0.869 | 250 |
| 2209-23-4 | 415 | 1.27 | 5.8 | 0.417 | 0.741 | 1.158 | 370 |
| 2209-23-5 | 465 | 1.28 | 5.1 | 0.048 | 0.946 | 0.994 | 323 |
| untreated | — | — | — | — | — | — | 1306 |

The results shown in Table 3 indicate that both the sodium content and the magnesium content of the silica xerogels in this series had an effect on the total haze obtained during testing. Viewing total haze as a function of combined sodium and magnesium content, the best and second best samples had combined Na and Mg contents of 0.490 and 0.869 mmol/g, respectively.

Example 6

Another series of silica xerogels was made by the general procedure of Example 5, in which Mg content was held substantially constant at approximately 0.43 mmol/g while Na content was varied. Beer was treated at a dose of about 480 ppm of silica gel. The results of chill haze testing with these xerogels is shown in Table 4.

TABLE 4

| Sample ID | SA (m2/g)) | PV (cc/g) | LOD (%) | Na (mmol/g) | Mg (mmol/g) | Na + Mg (mmol/g) | Total Haze (ASBC FTU) |
|---|---|---|---|---|---|---|---|
| 2168-44-1 | 408 | 1.32 | 5.2 | 0.52 | 0.43 | 0.950 | 610 |
| 2168-44-2 | 424 | 1.41 | 4.9 | 0.33 | 0.44 | 0.770 | 433 |
| 2168-44-3 | 424 | 1.42 | 5.7 | 0.22 | 0.42 | 0.641 | 464 |
| 2168-44-4 | 442 | 1.39 | 5.9 | 0.12 | 0.40 | 0.521 | 543 |
| untreated | — | — | — | — | — | — | 1440 |

Again, consistent with the foregoing examples, the two lowest total haze values obtained in this series had combined Na+Mg content of approximately 0.7 mmol/g.

Example 7

Another series of silica xerogels was made by a procedure analogous to that used in Example 3, but adding back potassium hydroxide rather than sodium hydroxide, followed by spray-drying the resulting potassium-containing silica gels. Beer was treated at a dose of about 480 ppm of silica gel. The results of chill haze testing with these xerogels, compared with untreated beer samples, is shown in Table 5, where the total haze results for each sample represent an average of three determinations.

TABLE 5

| Sample ID | SA (m²/g) | PV (cc/g) | LOD (%) | K (mmol/g) | Total Haze (ASBC FTU) |
|---|---|---|---|---|---|
| untreated | | | | | 1344 |
| 2217-62-1 | 386 | 1.75 | 6.2 | 0 | 411 |
| 2217-59-1 | 385 | 1.64 | 5.9 | 0.049 | 389 |
| 2217-59-2 | 383 | 1.60 | 6.1 | 0.097 | 329 |
| 2217-59-3 | 365 | 1.57 | 6.8 | 0.192 | 315 |

As seen in the other examples, the presence of increasing amounts of potassium resulted in decreasing values of total haze, within the range tested.

It should be noted that a number of parameters affect the level of haze measured in experiments such as those outlined in the above examples, including the permeability of the xerogel, its surface area, the particular characteristics of the beer that is used, and perhaps other parameters. Regardless of variations in haze measurement incurred by such differences, the presence of certain amounts of alkali metals in the silica, optionally in combination with certain amounts of alkaline earth metals, is of benefit in reducing chill haze.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A composition comprising a silica xerogel comprising between 0.2 and 1.0 mmol/g of a metal component per gram of the xerogel, wherein said metal component comprises at least one alkali metal in an amount between 0.2 mmol/g and 1.0 mmol/g, the xerogel having a pH between 8.0 and 10.5.

2. The composition of claim 1, wherein the xerogel comprises between 0.3 and 0.8 mmol/g of the metal component per gram of the xerogel.

3. The composition of claim 1, wherein the xerogel comprises between 0.4 and 0.7 mmol/g of the metal component per gram of the xerogel.

4. The composition of claim 1, wherein the at least one alkali metal is sodium.

5. The composition of claim 1, wherein the at least one alkali metal is potassium.

6. The composition of claim 1, wherein the pH of the xerogel is between 8.5 and 10.0.

7. The composition of claim 1, wherein the xerogel is an acid-set xerogel.

8. The composition of claim 1, wherein the xerogel is an alkaline-set xerogel.

9. The composition of claim 1, wherein the xerogel is a calcined xerogel.

10. The composition of claim 1, wherein the xerogel is a hydrothermally treated xerogel.

11. The composition of claim 1, wherein the metal component further comprises at least one alkaline earth metal.

12. The composition of claim 11, wherein the xerogel comprises less than 0.1 mmol/g in total of said at least one alkaline earth metal.

13. The composition of claim 12, wherein the xerogel comprises between 0.3 and 0.8 mmol/g of the metal component per gram of the xerogel.

14. The composition of claim 12, wherein the xerogel comprises between 0.4 and 0.7 mmol/g of the metal component per gram of the xerogel.

15. The composition of claim 12, wherein said at least one alkali metal is sodium.

16. The composition of claim 12, wherein said at least one alkali metal is potassium.

17. The composition of claim 12, having a pH between 8.5 and 10.0.

18. The composition of claim 12, wherein the xerogel is an acid-set xerogel.

19. The composition of claim 12, wherein the xerogel is an alkaline-set xerogel.

20. The composition of claim 12, wherein the xerogel is a calcined xerogel.

21. The composition of claim 12, wherein the xerogel is a hydrothermally treated xerogel.

22. The composition of claim 11, wherein:
the xerogel is a hydrothermally treated xerogel comprising less than 0.1 mmol/g in total of said at least one alkaline earth metal;
the xerogel comprises between 0.4 and 0.7 mmol/g of the metal component per gram of the xerogel;
said at least one alkali metal is sodium; and
the pH is between 8.5 and 10.0.

23. A method of making a silica xerogel comprising the steps of:
a) contacting an aqueous alkali metal silicate with an amount of an aqueous mineral acid sufficient to neutralize between 70% and 95% of the alkali metal in the alkali metal silicate, thereby forming a hydrogel;
b) contacting the hydrogel with an aqueous solution of an alkaline earth metal salt to incorporate at least a portion of the alkaline earth metal into the hydrogel;
c) aging the hydrogel;
d) washing the hydrogel with water; and
e) drying the hydrogel to form a xerogel;
wherein the silica xerogel comprises between 0.2 and 1.0 mmol/g of a metal component per gram of the xerogel comprising at least 0.2 mmol/g but less than 1.0 mmol/g of the alkali metal per gram of the xerogel and correspondingly no more than 0.8 mmol/g but more than 0 mmol/g of the alkaline earth metal per gram of the xerogel, the xerogel having a pH between 8.0 and 10.5.

24. The method of claim 23, wherein a molar ratio of the alkali metal to the alkaline earth metal in the metal component is between about 5:95 and about 95:5.

25. The method of claim 23, wherein a molar ratio of the alkali metal to the alkaline earth metal in the metal component is between about 30:70 and about 70:30.

26. The method of claim 23, further comprising a step of:
f) calcining the xerogel.

* * * * *